United States Patent [19]
Reisch

[11] 3,725,534
[45] Apr. 3, 1973

[54] METHOD OF FORMING COMPLEX COBALT CARBONYL COMPOUNDS

[75] Inventor: John C. Reisch, Cranford, N.J.

[73] Assignee: Esso Research and Engineering Company

[22] Filed: Mar. 10, 1969

[21] Appl. No.: 814,493

Related U.S. Application Data

[63] Continuation-in-part of Ser. No. 774,452, Jan. 18, 1968, abandoned.

[52] U.S. Cl. .......................... 423/417, 260/604 HF
[51] Int. Cl. .......................... C01g 1/04, C01g 51/02
[58] Field of Search ........................ 23/203, C; 260/439 R, 604 HF

[56] References Cited

UNITED STATES PATENTS

| | | | |
|---|---|---|---|
| 2,858,194 | 10/1958 | Miller | 23/203 C |
| 2,865,716 | 12/1958 | Hasek | 23/203 C |
| 2,992,275 | 7/1961 | Niwa et al. | 23/203 C X |
| 3,188,351 | 6/1965 | Jemke | 23/203 C X |
| 3,507,615 | 4/1970 | Usami | 23/203 C |

FOREIGN PATENTS OR APPLICATIONS 1,030,963  5/1966  Great Britain ............ 23/203 C Primary Examiner—Earl C. Thomas
Attorney—Chasan and Sinnock and J. E. Luecke

[57] ABSTRACT

Complex cobalt carbonyl compounds containing a cobalt tetracarbonyl ($Co(CO)_4^-$) anion are formed in the aqueous phase through the reaction of a cobalt material with carbon monoxide in the presence of hydrogen, a noble metal catalyst and a promoter. Useful promoters include alkali and alkaline earth metal compounds, in particular alkali and alkaline earth salts of weak acids, ammonium compounds, amine compounds and quaternary ammonium compounds. The complex cobalt carbonyl compounds thus formed can be converted to useful oxonation catalysts by contacting the same with a mineral acid.

12 Claims, 2 Drawing Figures

METHOD OF FORMING COMPLEX COBALT CARBONYL COMPOUNDS

CROSS-REFERENCE TO RELATED APPLICATION

This application is a continuation-in-part of Ser. No. 774,452, filed Nov. 8, 1968, and now abandoned.

BACKGROUND OF THE INVENTION

I. Field of the Invention

The present invention relates to a process for the preparation of complex cobalt carbonyl compounds containing a cobalt tetracarbonyl anion. More particularly, the invention relates to the formation of complex cobalt carbonyl compounds through the aqueous phase reaction of a cobalt material with carbon monoxide in the presence of hydrogen, a noble metal catalyst and a promoter. Additionally, the present invention relates to an improved method for recovering and regenerating the cobalt carbonyl catalyst employed in the oxonation of olefins to aldehydes.

II. Description of the Prior Art

The oxonation of olefins is a commercially used technique for the production of oxygenated organic compounds, such as aldehydes, alcohols, esters and the like. In general, the process consists of reacting olefinic materials with carbon monoxide and hydrogen at elevated temperatures and pressures in the presence of a cobalt carbonyl catalyst. Particularly useful catalyst materials are cobalt hydrocarbonyl ($HCo(CO)_4$) and dicobalt-octacarbonyl ($Co_2(CO)_8$).

One problem associated with the oxo process is the recovery, subsequent regeneration and recycle of the cobalt carbonyl catalyst to the oxonation reaction zone. Numerous techniques have been devised by the prior art workers to meet the difficulties encountered in recovering and regenerating the catalyst employed in the oxo process. One technique involved contacting the crude oxo reaction mixture (which contains the cobalt carbonyl catalyst) with an aqueous sodium carbonate mixture in order to form sodium cobalt carbonyl compounds which were subsequently recovered, regenerated and returned to the reactor. Because of the volatile nature of the cobalt carbonyl catalyst, the contacting between the aqueous sodium carbonate solution and the crude oxo reaction product is conducted at elevated pressures. The use of elevated pressures serves to increase the capital cost of the plant and the operating cost of the oxo operation. The above-described technique is described in more detail in U.S. Pat. No. 3,188,351.

Another technique for oxo catalyst regeneration is described in U.S. Pat. No. 2,816,999. According to the disclosed process, the crude oxo reaction product containing the cobalt carbonyl catalyst is first contacted with dilute aqueous solutions of an organic acid to form water soluble cobalt salts. Subsequently, these cobalt salts are contacted with hydrogen and carbon monoxide in the presence of water and a crude alcohol mixture in order to arrive at a cobalt hydrocarbonyl product in the organic phase. This operation is not entirely satisfactory from a commercial standpoint because of the relatively slow reaction rate of the hydrocarbonyl formation reaction and the fact that problems are encountered in completely converting the cobalt salts to the desired carbonyl compound. Another variation of the above-described technique is disclosed in U.S. Pat. No. 3,236,597.

It is an object of this invention to provide a novel process for the production of complex cobalt carbonyl compounds at high conversion levels. Another object of this invention is to provide a process for the production of high purity complex cobalt carbonyl compounds from cobaltous compounds in a substantially aqueous system. A still further object is to provide a technique for the formation of cobalt carbonyl compounds that can be integrated into an olefin oxonation process, thereby providing a method for the recovery, regeneration and recycle of the cobalt carbonyl catalysts to the oxo reaction zone. These and other objects of the invention will become more apparent as the description thereof proceeds.

SUMMARY OF THE INVENTION

Now, in accordance with the present invention, it is discovered that complex cobalt carbonyl compounds containing a cobalt tetracarbonyl anion ($Co(CO)_4^-$) can be formed at high conversion levels by contacting, in a water reaction medium, a cobalt material, preferably a substantially water-soluble cobalt compound, with carbon monoxide in the presence of hydrogen, a noble metal catalyst and a salt forming promoter compound. The reaction is conducted at elevated temperatures and pressures. The cationic portion of the complex cobalt compound formed with the present synthesis is the salt forming portion or cation of the promoter compound. To secure the desired high conversions to the complex cobalt carbonyl compound, it is necessary to use certain types of promoter materials. When salts are employed as the promoter, the anionic portion of the salt should be the anion of a weak acid; that is, an acid having a dissociation constant less than about $1 \times 10^{-2}$. The present process, when integrated into a conventional oxonation process, permits the transformation of cobalt compounds, generally cobalt salts, secured from the demetalling stage of the oxonation process to complex cobalt carbonyl compounds wherein the cobalt is present in the compound only as a cobalt tetracrabonyl anion. The complex cobalt carbonyl compounds can subsequently be converted through contact with a mineral acid to active cobalt hydrocarbonyl and dicobalt octacarbonyl oxonation catalyst species.

Representative examples of reactions contemplated by the instant invention proceed according to the following equations:

I. 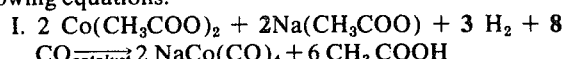

II. 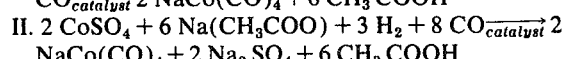

III. 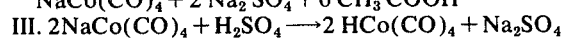

Equations I and II illustrate the reaction of cobalt salts, namely cobalt acetate and cobalt sulfate, with carbon monoxide in the presence of hydrogen and a sodium acetate promoter compound. The reaction products consist of the desired complex cobalt carbonyl compound, namely sodium cobalt carbonyl, and byproduct acetic acid and sodium sulfate. As is noted in Equation III, the complex cobalt carbonyl compound, namely sodium cobalt carbonyl, when contacted with a mineral acid such as sulfuric acid, is converted to cobalt hydrocarbonyl. This material is a highly active oxonation catalyst.

Various types of cobalt materials are suitable as starting materials in the synthesis of complex cobalt carbonyl compounds. Desirably, the cobalt materials are substantially water soluble cobaltous compounds. Typically, the water soluble salts of organic and inorganic acids are employed; however, substantially water insoluble materials such as metallic cobalt, cobalt oxide and cobalt hydroxide can also be used. The organic acid anion of organic cobalt salts may contain from one to eight, preferably one to six, carbon atoms per molecule. Representative, non-limiting examples of useful cobalt materials include cobaltous sulfate, cobaltous bromide, cobaltous acetate, cobaltus chloride, cobaltous iodide, cobaltous propionate, cobaltous hydroxide, etc.

The type of promoter compound employed in the synthesis operation is a critical feature of the instant invention. The promoter material should be substantially water soluble or be capable of forming substantially water soluble salts with the $Co(CO)_4^-$ anion and further must not itself (or any constituent part thereof) form simple carbonyl compounds. The compound must react or complex with the cobalt tetracarbonyl anion to form the final complex cobalt carbonyl material. Typically, the promoter is a water soluble metal salt oxide or hydroxide or amine compound that will form water soluble salts upon contact with the cobalt tetracarbonyl anion. Useful promoter materials include alkali metal salts and hydroxides, alkaline earth metal salts and hydroxides, ammonium salts and hydroxides, quaternary ammonium salts and hydroxides, mercury salts, and water soluble or substantially water soluble aromatic and aliphatic amine compounds. Particularly preferred amine compounds are the lower aliphatic amine materials, more particularly primary, secondary and tertiary lower alkyl and alkanol amines. Sodium and ammonium compounds are the preferred promoter compounds. Typically, the alkyl constituent of an alkyl amine compound will contain from one to four, preferably one to two, carbon atoms per molecule. The amine materials tend to react with the acidic cobalt tetracarbonyl anion to form water soluble salts.

The instant process for the formation of the complex cobalt carbonyl compounds is critically sensitive to the presence of strong acids. Hence, to maintain acid formation at a minimum level during the course of the reaction, it is necessary that when organic or inorganic salts are employed as the reaction promoter that the anion of the salt be an anion of a weak acid, that is an acid having a dissociation constant less than about $1 \times 10^{-2}$. Acids having a dissociation constant greater than about $1 \times 10^{-2}$ include materials such as sulfuric acid, nitric acid, hydrochloric acid, hydrobromic acid, etc.

Representative examples of useful promoter materials include sodium acetate, sodium benzoate, sodium citrate, sodium hydroxide, potassium acetate, potassium hydroxide, potassium chlorate, mercurous acetate, ammonium acetate, ammonium hydroxide, strontium acetate, rubidium acetate, tetraethylammonium hydroxide, mercurous chlorate, aniline, n-butylamine, diethylamine, ethylamine, isopropylamine, N-methylbutylamine, triethylamine, etc.

In the formation of the complex cobalt carbonyl compounds, the cobalt material and the promoter are contacted with a synthesis gas mixture composed of hydrogen and carbon monoxide. The molar ratio of hydrogen to CO may vary from 0.5:1 to 2:1. The hydrogen and carbon monoxide are normally admitted into the reaction zone as a mixture; however, they may be introduced as individual gas streams. Typically, a molar excess of carbon monoxide is used. The gas streams employed should be purified prior to use to preclude the presence of materials that will inhibit the course of the reaction such as strong acids or catalyst poisons.

The instant reaction is conducted in the liquid phase, preferably in a water reaction medium. By the expression "water reaction medium" is meant a liquid system composed of at least about 80 volume percent water, based on total liquids (water and organic materials). Preferably, the "water reaction medium" is composed of at least about 90 to 95 volume percent water. Most preferably, the reaction is conducted in the substantial absence of organic diluents or contaminants; that is, the water reaction medium contains less than about 2 to 3 volume percent of organic diluents or contaminants. The water employed should be free of strong acid materials and catalyst poisons. The presence of organic substituents such as aldehydes, olefins, etc., does not interfere with the course of the reaction. However, their presence serves to complicate the process by increasing materials handling problems. The amount of water employed as the process diluent can vary over a wide range. To minimize materials handling problems sufficient amounts of water are employed to solubilize or disperse the cobalt compounds and the promoter; however, it should be recognized that larger volumes may be used.

The temperatures and pressures at which the reaction is conducted are important process variables. Either elevated pressures and/or temperatures should be employed. Typically, a synthesis gas pressure of at least about 200 psig should be employed; however, synthesis gas pressures ranging from 200 to about 4,500 psig, preferably 500 to 3,000 psig, most preferably between 1,500 and 3,000 psig, may be used. If it is not desired to use elevated reaction pressures, it is necessary that elevated temperatures ranging from 120° to 350°F., preferably from 150° to 250°F., be employed to secure high conversion levels of the cobalt compound to the desired complex cobalt carbonyl compound. The length of the reaction period depends primarily upon the choice of the process reactants and the temperatures and pressures employed. Optimum reaction times may vary in the range of about several minutes to several hours. Ordinarily, the complex cobalt carbonyl compound formation reaction proceeds relatively rapidly. In most instances, a high level of carbonyl compound formation is achieved within about 2 to 90 minutes, more generally within from 5 to 30 minutes.

The reaction for the formation of the cobalt carbonyl compounds is promoted with a noble metal catalyst, in particular a catalyst selected from the metals of Group IB and VIII of the Periodic Table (see Mack et al, Textbook of Chemistry, second Edition, Ginn and Company (1956), p. 313). Representative examples of useful catalyst materials include gold, platinum and palladium. Palladium is the preferred catalyst metal. The catalyst materials can be employed as such in either a slurry or a fixed bed system. Preferably, the active catalyst materials are embedded on a solid support such as carbon, coke or alumina. Typically, when a supported catalyst system is used, the active catalyst metal makes up approximately 0.1 to 5.0 weight percent, preferably 0.2 to 2.0 weight percent, of the total supported catalyst structure. When a slurry system is used (as opposed to employing a fixed bed of catalyst), catalyst metal is present within the reaction zone in amounts varying from 5 to 50 weight percent based upon cobalt compound, expressed as elemental cobalt.

The invention may be better understood by reference to FIG. 1, which illustrates a flow diagram of the process integrated within an oxo processing scheme for the formation of aldehydes from olefinic feedstocks. Referring now to FIG. 1, a synthesis gas mixture composed of hydrogen and carbon monoxide, an olefin feed and an organic cobalt carbonyl catalyst solution are passed, after preheating (not shown), through feedlines 1, 2 and 3, respectively, into oxonation reactor 4. The oxo reactor is a vessel or series of vessels which may be, if desired, packed with Raschig rings, pumice or the like within one or more discrete zones.

The organic cobalt carbonyl catalyst solution is prepared in a manner more fully described hereinafter. Cobalt carbonyl concentration in the feed being introduced into the oxo reactor is normally equivalent to about 0.1 to 0.5 weight percent cobalt based on olefin feed. Typically, the olefin gas stream is a single olefin or olefin mixture having from three to 13 carbon atoms per molecule. The synthesis gas mixture may consist of any volume ratio of hydrogen to carbon monoxide, but the materials are preferably introduced in approximately equal volumes. Conventionally, reactor 4 is operated at pressures in the range of about 1,500 to 4,500 psig at temperatures in the range of from about 150° to 450°F. depending upon the nature of the olefin feed and other reaction variables.

The product from the oxo reactor is a liquid oxygenated material composed primarily of aldehyde materials having one more carbon atom than the initial olefin feed. The aldehyde product contains the cobalt carbonyl catalyst in solution. The reaction product as well as unreacted olefins and synthesis gas are withdrawn from reactor 4 overhead via line 5, passed through heat exchanger 6 into high pressure separator 7. Within the separator, unreacted gas material is separated from the liquid aldehyde product and the gas material withdrawn overhead through line 8 and either vented through line 9 or recycled back to the reactor by means of recycle line 10.

The primary reaction product which contains dissolved cobalt carbonyl catalysts and other forms of cobalt is withdrawn from the separator via line 20, passed through pressure release valve 21 and lines 22 and 23 into mixer 24. Mixer 24 is of any conventional design and is adapted to thoroughly mix an aqueous and a liquid organic phase. The cobalt catalyst and other cobalt residues contained in the reaction product are removed from the aldehyde product by contacting the reaction product in mixer 24 with a water solution of an acid whose cobalt salts are substantially water soluble. The acid solution is injected into mixer 24 via lines 25 and 23. Various types of acids, both organic and inorganic, may be employed to achieve cobalt removal. Low molecular weight organic acids, in particular acetic acid, are the preferred materials because their cobalt salts are very soluble in water, thereby requiring less water for their complete recovery. Acid requirements are in the range of about 50 to 150 percent of the amount theoretically required to convert the cobalt materials to the water soluble cobalt salt of the acid. About 10 to 20 volume percent (based on aldehyde product) of a solution of the inorganic or organic acid, preferably 10 to 15 volume percent, is sufficient to effectively recover the cobalt catalyst from the organic phase. Typically, mixer 24 is operated at a pressure of about 0 to 200 psig and at temperatures ranging from 180° to 250°F., preferably 220° to 240°F.

The inorganic or organic acid used to recover the cobalt from the organic phase can be replaced with or supplemented with cobalt salts, in particular cobalt salts of weak organic acids such as cobalt acetate or cobalt formate. The addition of these materials to mixer 24 serves to convert the water insoluble cobalt carbonyls present in the organic phase to water soluble cobalt salts. In addition, the new cobalt added would serve to make up for any cobalt lost during the reaction and/or subsequent cleanup procedures. The cobalt is introduced in such quantities as to maintain at least 100 to 150 percent of the stoichiometric equivalent of cobaltous ion with respect to the $Co(CO)_4^-$ present in the aldehyde in mixer 24. When cobalt salts are used alone or in combination with organic acids, temperatures and pressures similar to those employed when an acid is used alone are employed. Normally, a residence time of from 15 to 120 minutes in the mixer 24 is adequate for the conversion of the cobalt carbonyls to water soluble cobalt salts.

From mixer 24, the organic/aqueous mixture is pumped through line 26 into settler 27 where the aqueous and aldehyde layers are permitted to stratify. Substantially all of the cobalt materials are contained in the lower aqueous layer. The organic aldehyde layer is then passed to water washing equipment 29 via line 28. In washer 29, the crude aldehyde product is contacted with hot water at a temperature varying from about 160° to 180°F. to wash the last traces of cobalt from the aldehyde. The hot water is introduced into washing tower 29 through lines 30. Generally about 10 volume percent of wash water, based on aldehyde, is used. The wash water, after stratification, is withdrawn through line 31 and may be discarded or, as depicted in FIG. 1, recycled to mixer 24 via line 25. As stated previously, line 25 is used to transfer a concentrated aqueous solution of organic or inorganic acid, cobalt salt, or a combination of the two to mixer 24. Finished aldehyde product is withdrawn overhead from the wash tower through line 32. The aldehyde product may be employed as such or may be subsequently treated such as by hydrogenating the same to alcohols.

Returning now to settler 27, the lower aqueous layer containing dissolved cobalt material is withdrawn through line 40 and passed to preformer 50. Makeup cobalt may be added to stream 40 by passing the same in the form of an aqueous solution of a water soluble compound, preferably an organic or inorganic salt such as cobalt acetate, cobalt sulfate, and the like through line 41. The promoter compound is introduced as an aqueous solution into line 40 via line 42. Typically, an alkali or alkaline earth metal salt of a weak acid is employed as the promoter. Preferred materials include sodium acetate and sodium hydroxide, ammonium acetate and ammonium hydroxide.

In order to achieve substantially complete (~100%) carbonylation of the cobaltous ions present in stream 40, the molar ratio of promoter to cobaltous ion must be properly adjusted, depending on the type of cobalt material used. If the cobalt material present within line 40 is a salt of an acid having a dissociation constant greater than $1 \times 10^{-2}$, enough promoter must be present within preformer 50 to prevent the accumulation of free acid within the preformer by reacting or complexing the same as a compound of the promoter compound. Hence, if sulfate, nitrate, chloride, etc., ions are present within the preforming zone, sufficient promoter must be present to react with these ions and also to form the complex cobalt product. Generally, at least a 3:1 molar ratio of promoter compound to cobaltous ion is required if the cobalt material used is a salt of a strong acid. If the cobalt material is not a salt of a strong acid (a material having a dissociation constant greater than $1 \times 10^{-2}$), a 1:1 molar ratio of promoter compound to cobaltous material is sufficient. It should be recognized that lesser amounts of promoter can be employed if complete carbonylation of the cobalt present in the stream is not wanted.

Stream 40, which contains the cobaltous ions and the proper quantity of promoter compounds in water solution or as a slurry, is passed to preforming reactor 50 along with synthesis gas contained in line 43. Preferably, preformer 50 contains a fixed bed of a granular or pelleted preforming catalyst. As noted earlier, the catalyst is preferably a noble metal material, preferably palladium, supported on an inert porous material such as carbon. Preformer 50 is operated at pressures ranging from about 200 to 4,500 psig and temperatures varying from about 120° to 350°F.

The effluent from preformer 50 is composed of an aqueous solution of a water soluble salt of cobalt hydrocarbonyl ($M[Co(CO)_4]_x$) wherein M is the salt or complex forming moiety of the promoter and $x$ is the valence of M. In addition to the main product, unreacted synthesis gas and the inorganic reaction byproducts are also withdrawn from the reactor. The total reactor effluent is passed via line 51 through heat exchanger 52 into separator 53. In the separator, unreacted gases are withdrawn overhead through line 54. These gases may be vented or recycled (not shown) to preformer 50 or oxonation reactor 4. The liquid phase product from separator 53 which consists of a water-soluble cobalt carbonyl salt or complex and other reaction by-products is withdrawn from the separator via line 55, passed through pressure release valve 56 and is then admixed with an aqueous solution of a strong mineral acid. The acid is introduced into line 55 via line 57. Strong mineral acids having dissociation constants greater than $1 \times 10^{-2}$, such as sulfuric acid, hydrochloric acid, hydrobromic acid and the like, are suitable for use. The function of the acid is to convert the complex cobalt carbonyl material to cobalt hydrocarbonyl. To achieve the complete conversion, at least a 1:1 molar ratio of acid to cobalt carbonyl ($Co(CO)_4^-$) anion in the preformer product is required. Alternatively, the complex salt may be fed directly to the oxonation reactor without being contacted with acid.

The acidified mixture is passed to the top of stripper 60 via line 55. Stripper 60 is preferably a vessel packed with an inert material such as Raschig rings or the like. A stream of inert gas is introduced into the base of stripper 60 through line 61 and is passed to countercurrent to the downward flow of the acidified preformer product. The upwardly passing inert gas serves to remove the highly volatile, substantially water-insoluble cobalt hydrocarbonyl ($HCo(CO)_4$) from the aqueous solution. The stripper is conventionally operated at pressures ranging from about 0 to 500 psig and at temperatures ranging from 30° to 150°F. In general, any inert gas such as synthesis gas mixtures (hydrogen and carbon monoxide), carbon monoxide, hydrogen, nitrogen, etc., may be used for the stripping operation. However, gas streams containing carbon monoxide are preferred since they have a tendency to stabilize the cobalt hydrocarbonyl material and thereby prevent its decomposition within the stripper. The aqueous solution from which the cobalt hydrocarbonyl has been stripped is withdrawn via line 62 and may be discarded or treated to recover the preformer and acidification by-products.

The stripping gas containing the volatilized cobalt hydrocarbonyl is taken overhead from the stripper through line 63 and injected into the bottom of absorber 70. The absorption vessel may be of design similar to the stripper 60. An organic solvent is fed through line 71 into the top of absorber 70 and is passed through the vessel downwardly countercurrent to the upward flow of the gas from stripper 60. The cobalt hydrocarbonyl, which is soluble in most organic solvents, is absorbed from the gas stream.

Desirably, the absorber is operated at pressures ranging from about 0 to 500 psig and temperatures ranging from 30° to 90°F. Useful solvents include materials such as saturated and unsaturated aromatic and aliphatic hydrocarbons, alcohols, aldehydes, and other products derived from the oxo synthesis. The olefin that is employed as the feed to the oxo reactor can be employed as the absorbent if the olefin is liquid at absorption conditions. The inert gas taken overhead from absorber 70 is passed through line 72 and may be vented via line 73 or recycled to inert gas inlet line 61 via line 74. The organic solvent that contains dissolved cobalt carbonyl compound is withdrawn through line 75 and passed into line 3 which empties into oxo reactor 4.

The present process, as noted earlier, permits the maximum utilization of cobalt materials recovered from the oxonation reaction. With the present system, from 90 to substantially 100 percent of the cobalt fed to the preformer is converted to catalytically active cobalt carbonyl. If the process were conducted in the absence of the promoter, the product recovered would be predominantly bis(tetracarbonyl cobalt)cobalt(II) ($Co[Co(CO)_4]_2$). Only 67 percent of the cobalt of this compound is in the catalytically active form.

The complex cobalt carbonyl compounds produced with the present invention have many varied uses. As noted earlier, the complex cobalt carbonyl compounds may be used directly as oxonation catalysts or may be contacted with a strong acid and the resulting product employed as highly effective hydroformylation catalyst. The complex carbonyls and their reaction products, in particular dicobalt octacarbonyl, may be employed for the treatment of wood products that are subsequently used in the formation of paper.

DESCRIPTION OF THE PREFERRED EMBODIMENTS

Figure 1:
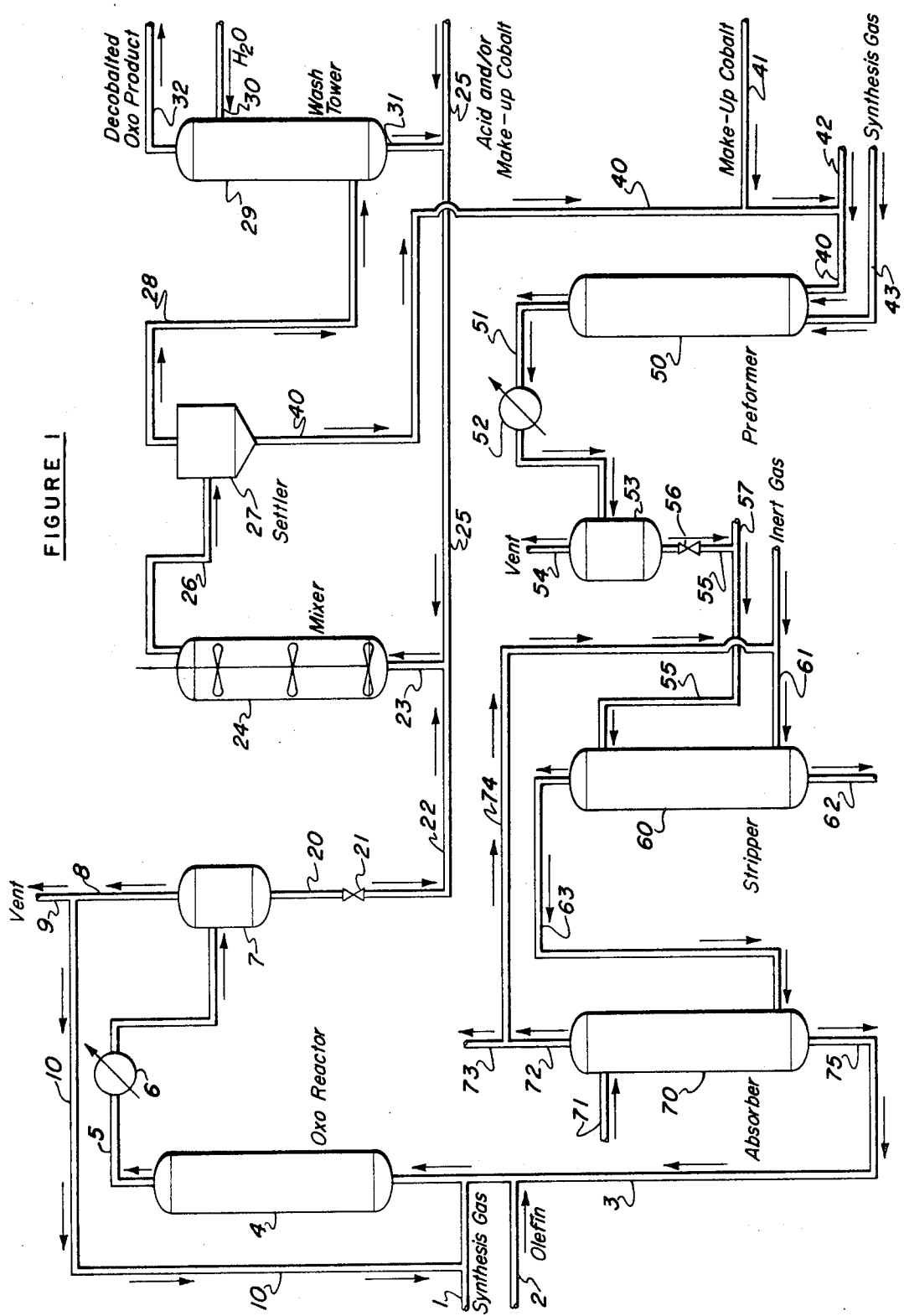

The invention will be further understood by reference to the following examples.

EXAMPLE 1

A series of tests were conducted to demonstrate the process for the formation of complex cobalt carbonyl compounds using the technique of the instant invention. All of the tests were made in a 300 cubic centimeter glass lined, chrome-vanadium steel rocker bomb. In one series of experiments an aqueous solution recovered from an acetic acid-cobalt acetate oxo demetalling test was used as the feed, but in all of the other studies the feed solution was prepared in a laboratory from reagent grade chemicals. In all of the tests a catalyst consisting of 2 weight percent of palladium on 4–8 U.S. Standard mesh granular carbon was used as the preforming catalyst.

In each test the bomb and glass liner was purged with nitrogen prior to charging the same with weighed quantities of feed solution and catalyst. The bomb was thereafter sealed and the preforming reaction was carried out at the temperatures and pressures selected for the test. After the reaction was completed, as indicated by no further synthesis gas uptake, the bomb was cooled and the gases vented. The glass liner, containing the aqueous product and catalyst, was removed under nitrogen atmosphere and the contents analyzed. In the first series of tests, cobalt acetate was employed as the starting material and sodium acetate as the promoter compound. The preforming operation was conducted at a temperature of 194°F. and a pressure of about 3,000 psig. The synthesis gas employed consisted of a 1:1 molar ratio of hydrogen to carbon monoxide. The catalyst was used at a concentration of 5 weight percent palladium based upon cobalt present within the reaction zone. The results of the tests were set forth in Table I below.

TABLE I

| Run | 2 | 1 | 3 | 4 |
|---|---|---|---|---|
| Feed Analysis: | | | | |
| $Co^{++}$(wt.%, based on aqueous feed solution) | 1.01 | 0.99 | 1.03 | 0.95 |
| $NaAc:Co(Ac)_2$ (mole ratio) | 0.00 | 0.50 | 1.00 | 1.50 |
| Product Analysis: | | | | |
| Total Co (wt.%, based on total product) | 0.93 | 0.94 | 0.97 | 0.89 |
| Co as $Co^{++}$ (wt.%) | 0.33 | 0.16 | 0.00 | 0.00 |
| Co as $Co(CO)_4^-$ (wt.%) | 0.60 | 0.78 | 0.97 | 0.89 |
| Carbonyl yield [Co as Co(CO) in product/Total Co in product] × 100 | 64.5 | 83.0 | 100 | 100 |
| % Recovery of Co charged | 97.0 | 98.6 | 95.9 | 96.4 |

As can be seen by referring to the data of Table I, the presence of varying amounts of sodium acetate promoter has a pronounced effect on the extent of carbonylation of the cobalt acetate to the desired sodium cobalt carbonyl ($NaCo(CO)_4$) compound. At 194°F. and 3,000 psig, a carbonyl yield of only 64.5 percent was obtained in the absence of the promoter. The conversion was improved 83 percent cobalt as cobalt tetracarbonyl ions when the promoter was added in a 0.5:1.0 mole ratio of $Na^+Co^{++}$. Complete conversion of the cobalt to the compound containing the desired cobalt tetracarbonyl anions was obtained when the promoter was employed at mole ratios of 1:1 and 1.5:1.

EXAMPLE 2

A second series of tests were conducted substantially identical to the experiments of Example 1 with the exception that cobalt sulfate was employed as the starting reagent rather than cobalt acetate. Sodium acetate was again employed as the promoter and the temperature, pressure, synthesis gas composition and catalyst concentration variables were identical to those employed in Example 1. The results of the tests are set forth in Table II below:

TABLE II

| Run | 1 | 2 | 3 | 4 |
|---|---|---|---|---|
| Feed Analysis: | | | | |
| $Co^{++}$ (wt.%) | 0.98 | 0.98 | 0.99 | 0.98 |
| $NaAc:CoSO_4$ (mole ratio) | 0.00 | 1.00 | 2.00 | 3.00 |
| Product Analysis: | | | | |
| Total Co (wt.%) | 0.95 | 0.96 | 0.95 | 0.97 |
| Co as $Co^{++}$ (wt.%) | 0.95 | 0.54 | 0.19 | 0.00 |
| Co as $Co(CO)_4$ (wt.%) | 0.00 | 0.42 | 0.76 | 0.97 |
| Carbonyl yield [Co as $Co(CO)_4^-$ in product/ Total Co in product] × 100 | 0.00 | 43.6 | 80.0 | 100 |
| % Recovery of cobalt charged | 98.8 | 97.2 | 98.1 | 96.9 |

As with Example 1, the presence or absence of promoter compound has a pronounced effect upon the extent to which the cobalt compound is converted to the desired complex cobalt carbonyl compound (its presence determined by the existence of cobalt tetracarbonyl anion). The data further shows the necessity of using a 3:1 molar ratio of promoter to cobalt compound in order to achieve 100 percent conversion of the cobalt compound to compounds containing the desired cobalt tetracarbonyl anion. This demonstrates the need to add a sufficient amount of promoter to combine completely with both the $Co(CO)_4^-$ and byproduct sulfuric acid as it is formed.

EXAMPLE 3

To demonstrate the effect of temperature and pressure on the reaction for the conversion of cobaltous compounds to complex sodium cobalt tetracarbonyls, a series of tests were conducted at various temperatures and pressures wherein cobalt acetate and sodium acetate were reacted for 2 hours in the aqueous phase with carbon monoxide and hydrogen in the presence of a palladium on carbon catalyst. The aqueous feed solution contained 1.0 weight percent cobalt and in the test from 1:1 to 1.5:1 moles of sodium acetate were employed per mole of cobalt acetate. The catalyst concentration was maintained at a level of about 5 weight percent of palladium based upon cobalt present within the reaction zone. The synthesis gas mixture was composed of equal volumes of carbon monoxide and hydrogen. The results of the tests are set forth in detail in FIG. 2.

Figure 2:
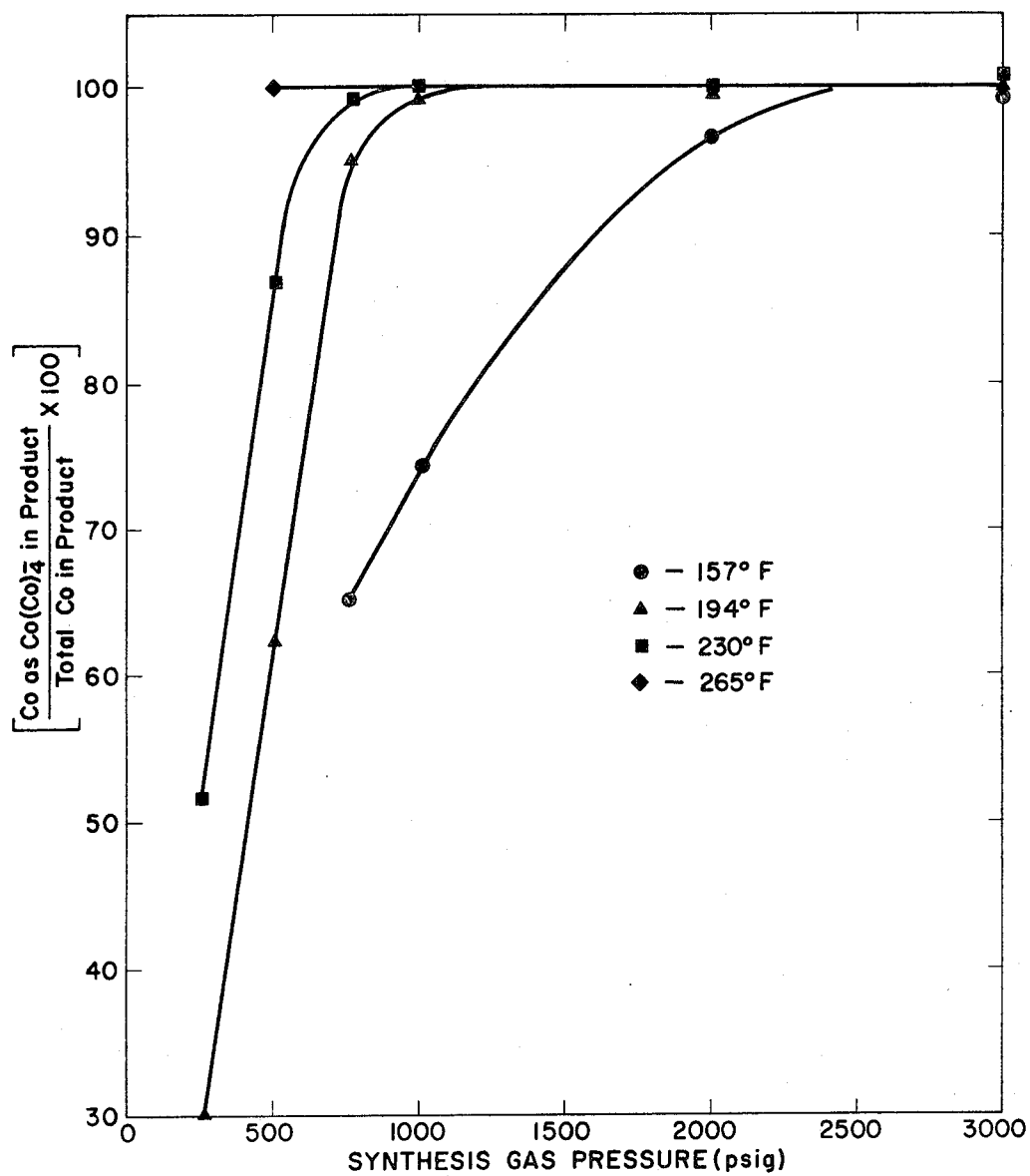

As can be seen by referring to FIG. 2, the degree of conversion of feed cobalt to the desired complex metal carbonyl compound varies directly with temperature and pressure. Maximum conversions can be secured using either elevated temperatures (265°F.) or elevated pressures (in excess of about 2,500 psig). Additionally, 100 percent conversions can be secured by using a combination of moderate temperatures and moderate pressures, as for example, at 194°F. and 1,000 psig synthesis gas pressure.

EXAMPLE 4

A further series of carbonylation reactions were conducted to ascertain the suitability of sodium hydroxide and ammonium acetate as promoters for the preforming of cobalt acetate to complex cobalt carbonyl compounds. In each test, an aqueous solution of 1 weight % $Co^{++}$ as cobalt acetate was admixed with sufficient amounts of sodium hydroxide or ammonium acetate to secure a 1:1 mole ratio of promoter to cobalt acetate. This material along with 0.5 weight percent of a palladium on carbon catalyst were introduced into a 300 cubic centimeter stainless steel bomb. Catalyst concentration within the bomb was 5.0 weight percent of palladium based upon cobaltous ion present. Each of the tests were conducted at 194°F. at an initial synthesis gas pressure (equal volumes of carbon monoxide and hydrogen) of 3,000 psig. During the course of about 3 hours, the pressure within the reaction zone was monitored to determine the rate at which carbon monoxide was consumed in the system. Plots of pressure decay vs. time for the tests wherein sodium hydroxide and ammonium acetate were used as the reaction promoters were substantially identical to the plots secured when sodium acetate was employed as the promoter (Examples 1, 2 and 3).

In the reaction wherein sodium hydroxide was employed as the reaction promoter, substantially water insoluble cobaltous hydroxide was formed upon contacting the cobalt acetate with the promoter. Nevertheless, the pressure decay tests indicated that the carbonylation of the cobalt proceeded even though the cobalt hydroxide was insoluble in the water medium.

What is claimed is:

1. A method of forming complex cobalt carbonyl compounds containing a cobalt tetracarbonyl anion having the formula $(Co(CO)_4^-)$ and a cation selected from the group consisting of lithium, sodium, potassium, rubidium, mercurous, ammonium and quaternary ammonium ions which comprises reacting, in a water reaction medium, a cobalt material selected from the group consisting of water soluble cobaltous salts of organic and inorganic acids, metallic cobalt, cobalt oxide and cobalt hydroxide with carbon monoxide in the presence of hydrogen, a reaction promoter, said promoter being selected from the group consisting of water soluble alkali metal salts, mercurous salts, ammonium salts and quaternary ammonium salts, the anion of said salts being an anion of an acid having a dissociation constant less than about $1 \times 10^{-2}$ and in the presence of a noble metal catalyst at elevated temperatures and pressures for a time sufficient to secure said complex cobalt carbonyl compound.

2. The process of claim 1 wherein said reaction is conducted at a temperature varying from 120° to 350°F. and at a pressure ranging from 200 to 4,500 psig.

3. The process of claim 1 wherein said noble metal catalyst is a metal selected from the group consisting of metals of Groups IB and VIII of the Periodic Table.

4. The process of claim 1 wherein the molar ratio of promoter compound to cobalt material within the reaction zone is maintained at a level of at least about 1:1 when said cobalt material is a salt of an acid having a dissociation constant less than about $1 \times 10^{-2}$ and a molar ratio of promoter compound to cobalt material within the reaction zone is maintained at a level at least about 3:1 and the cobalt material is present in the reaction zone as a salt of an acid having a dissociation constant greater than about $1 \times 10^{-2}$.

5. The method of claim 1 wherein said complex cobalt carbonyl compound is sodium cobalt carbonyl.

6. The method of claim 1 wherein said complex cobalt carbonyl compound is ammonium cobalt carbonyl.

7. A method for forming complex cobalt carbonyl compounds containing a cobalt tetracarbonyl anion having the formula $(Co(CO)_4^-)$ and a cation selected from the group consisting of sodium, potassium, rubidium, mercurous and ammonium ions which comprises contacting within a reaction zone, in a water reaction medium, a cobalt material selected from the group consisting of water soluble salts of acids having a dissociation constant less than about $1 \times 10^{-2}$ with carbon monoxide in the presence of hydrogen, a promoter compound, said promoter compound being selected from the group consisting of alkali metal salts, mercurous salts ammonium salts, and quaternary ammonium salts, the anion of said salts being an anion of an acid having a dissociation constant less than about $1 \times 10^{-2}$, and in the presence of a noble metal catalyst selected from the group consisting of metals of Groups IB and VIII of the Periodic Table, at a temperature ranging from 150° to 250°F. and at a pressure varying from 500 to 3,000 psig, the molar ratio of promoter compound to cobalt material within said reaction zone being at least about 1:1.

8. The process of claim 7 wherein the molar ratio of promoter compound to cobalt material within the reaction zone is maintained at a level at least about 1:1 when3:1 when the cobalt material is present in the reaction zone as a salt of an acid having a dissociation constant greater than about $1 \times 10^{-2}$.

9. The process of claim 8 wherein said noble metal catalyst is palladium contained on a carbon support.

10. The process of claim 9 wherein said promoter compound is a sodium compound.

11. The process of claim 9 wherein said promoter compound is an ammonium compound.

12. The process of claim 7 wherein said water reaction medium is composed of at least about 90 volume percent water.

* * * * *